United States Patent [19]

Hall et al.

[11] Patent Number: 5,562,296

[45] Date of Patent: Oct. 8, 1996

[54] BICYCLE FENDER

[76] Inventors: S. Warren Hall; Jacquelyn L. O. Hall, both of 3 Cranleigh Ct., Etobicoke, Ontario, Canada, M9A 3Y2

[21] Appl. No.: 298,269

[22] Filed: Aug. 31, 1994

[30] Foreign Application Priority Data

Aug. 31, 1993 [CA] Canada ................................. 2105273

[51] Int. Cl.[6] ................................................. B62D 25/16
[52] U.S. Cl. ................................. 280/152.3; 280/152.1; 280/852; 293/105
[58] Field of Search .............................. 280/152.3, 852, 280/851, 154, 152.2, 152.1, 160.1, 159; D12/186, 181, 184; 293/105, 106, 118, 119

[56] References Cited

U.S. PATENT DOCUMENTS

| D. 349,087 | 7/1994 | Rowley | D12/186 |
|---|---|---|---|
| 741,997 | 10/1903 | Beckwith | 280/152.3 |
| 868,461 | 10/1907 | Lockwood | 280/152.3 |
| 5,121,935 | 6/1992 | Mathieu | 280/152.3 |
| 5,322,311 | 6/1994 | Dunn | D12/186 |

FOREIGN PATENT DOCUMENTS

| 0969581 | 6/1975 | Canada | 293/105 |
|---|---|---|---|
| 1108664 | 9/1981 | Canada | B62K 27/10 |
| 0523811 | 1/1993 | European Pat. Off. | B62J 15/00 |
| 1022510 | 3/1953 | France | 280/152.3 |
| 2417429 | 10/1979 | France | 280/152.3 |
| 0020520 | of 1894 | United Kingdom | 280/152.3 |
| 0016472 | of 1896 | United Kingdom | 280/152.3 |
| 0014261 | of 1897 | United Kingdom | 280/152.3 |
| 0010659 | of 1899 | United Kingdom | 280/152.3 |

*Primary Examiner*—Anne Marie Boehler

[57] ABSTRACT

The present invention relates to bicycle fenders and in particular to bicycle fenders which are easily removed from a bicycle. In a preferred form, the bicycle fender is manually distorted to a compact storage condition. This storage condition allows the fender to be carried on a bicycle in a non-operating, convenient condition or carried by the user. In this way, the fender may be applied when conditions merit a fender and the fender may be easily removed.

10 Claims, 3 Drawing Sheets

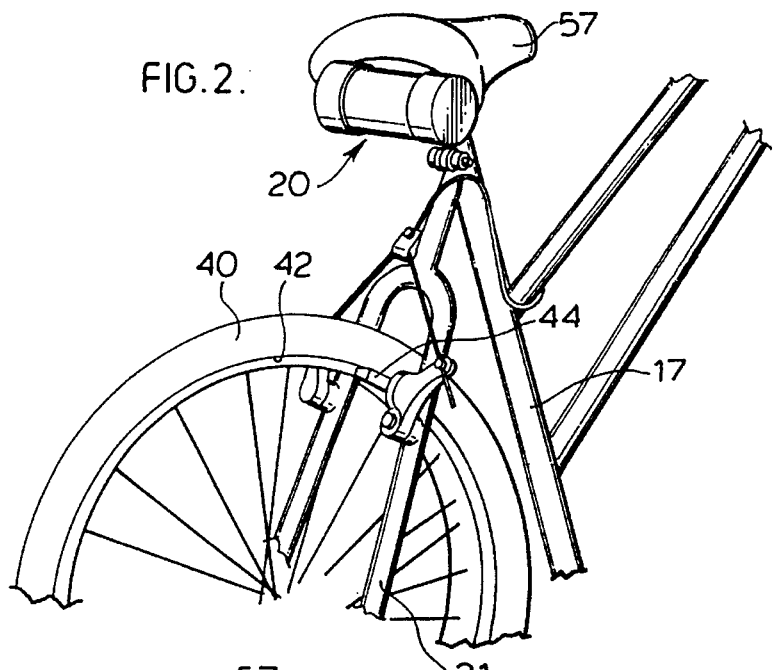
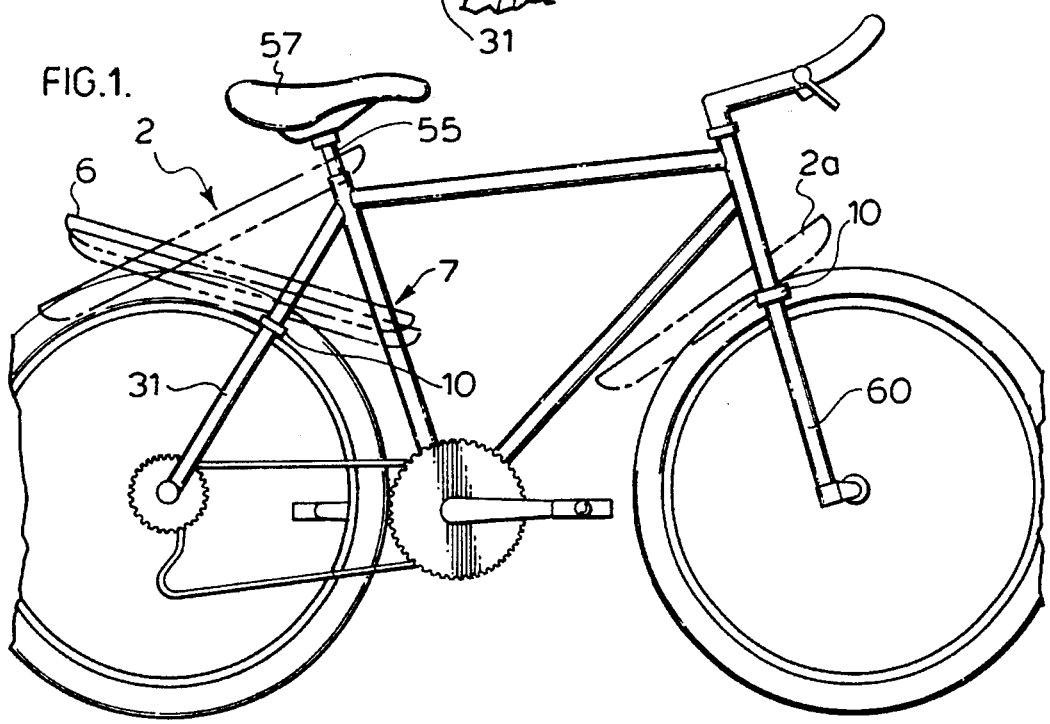

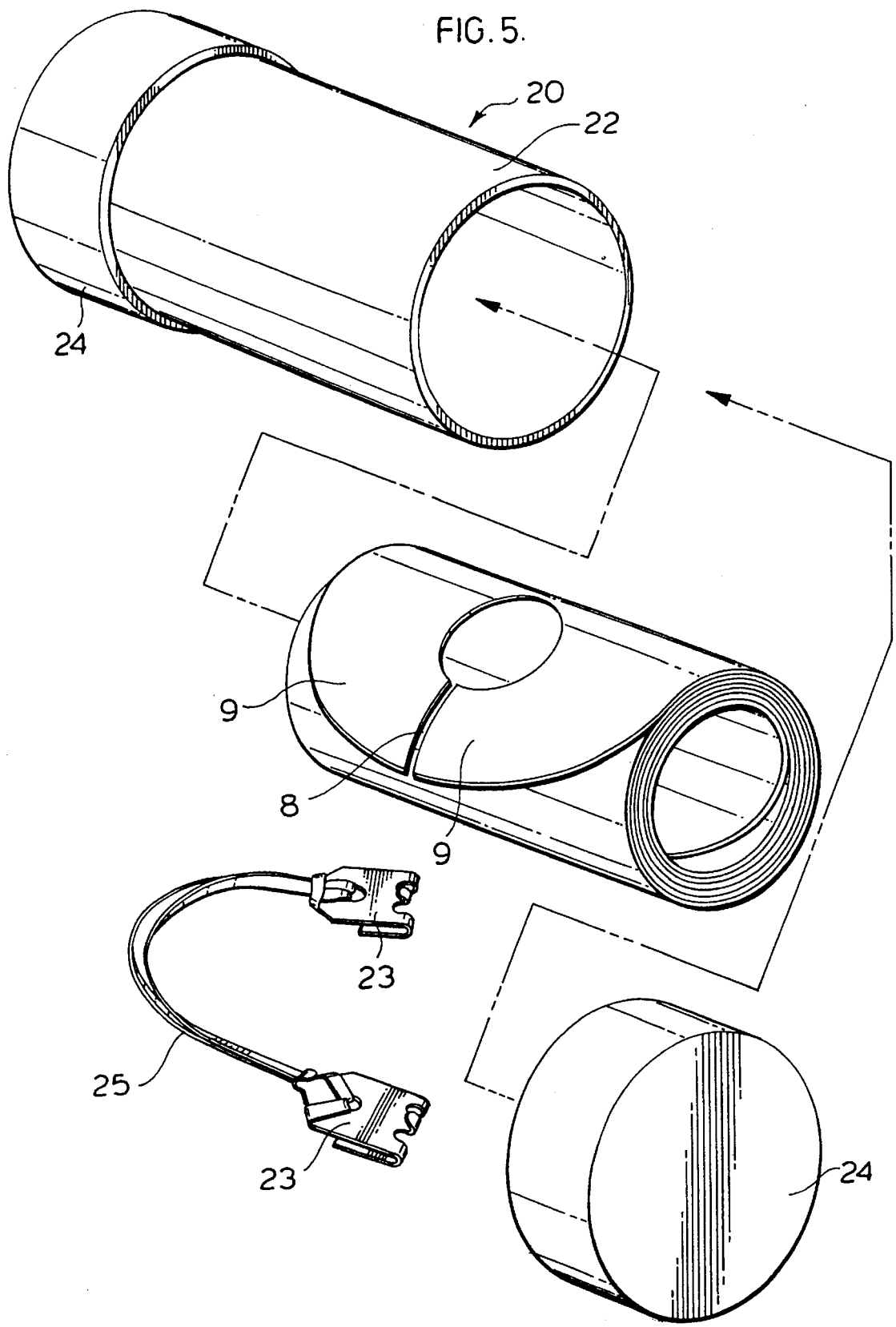

BICYCLE FENDER

FIELD OF THE INVENTION

The present invention relates to bicycle fenders, and in particular to bicycle fenders which may be easily secured and easily removed from a bicycle.

BACKGROUND OF THE INVENTION

In recent years, there has been a resurgence in the number of bicycles and using the bicycle as an effective means of transportation. The geared racing bikes with narrow profile tires have proven popular, however, now the mountain bike with a wider profile tire and design for off-road conditions is perhaps the most common type of bicycle sold for recreation. Some of these bicycles do include, or can have added thereto, fenders, however, many of them do not have any fenders, as this is the preferred appearance for many users. A bicycle without a fender is not a problem and for dry riding conditions this appearance of the bicycle is generally preferred, however, most users would agree that a fender is very helpful on a rainy day or where the surface being travelled over is wet.

In this regard, a number of fender designs have been proposed as after-market fenders, which can be installed by the user.

There remains a need to provide a convenient fender, and in particular a convenient rear fender for bicycles.

SUMMARY OF THE INVENTION

A bicycle fender, according to the present invention, is adapted such that it can take on a compact storage configuration or an operating configuration for securement to a bicycle. The bicycle fender can be manually transformed from the operating configuration to the storage configuration. The bicycle fender in the compact storage configuration is in a state which is not suitable for operating as a bicycle fender.

According to an aspect of the invention, the fender is resiliently deformed when transformed from the operating condition to the storage condition.

According to a preferred aspect of the invention, the bicycle fender in an unstressed state assumes the operating configuration.

According to yet a further aspect of the invention, the fender is resiliently deformed during transition from the operating configuration to the storage configuration by rolling of the fender upon itself.

According to yet a further aspect of the invention, the fender is transformed from the operating condition to the storage configuration by rolling of the fender longitudinally upon itself to a coil-like configuration, preferably having a plurality of windings to the coil.

According to yet a further aspect of the invention, the coil configuration is of a diameter less than six inches and preferably less than about four inches. It can be appreciated that the bicycle fender is made of a resilient material and preferably a resiliently deformable plastic. The plastic should be such that although the fender is in a stressed state in the storage configuration, permanent deformation does not occur and when the stress is removed, it will assume the operating configuration.

According to yet a further aspect of the invention, the bicycle fender is used in combination with a retaining arrangement which maintains the fender in the storage configuration.

According to yet a further aspect of the invention, the retaining arrangement is a closable container in which the fender, in a storage condition, is maintained. The fender, when located in the storage container, only occupies a small percentage of the volume of the container whereby the remaining volume of the closable container not occupied by the fender is available for storage of other material.

According to yet a further aspect of the invention, the storage container is designed for simple securement to a bicycle.

According to yet a further aspect of the invention, the retaining arrangement is designed to maintain the fender in a coiled configuration and the fender is secured in an existing restricted area of a bicycle.

According to yet a further aspect of the invention, the bicycle fender, in the operating configuration, has a generally open channel cross section, which channel cross section is flattened when the fender is deformed to the storage configuration.

BRIEF DESCRIPTION OF THE DRAWINGS

Preferred embodiments of the invention are shown in the drawings, wherein:

FIG. 1 shows a schematic of a bicycle with bicycle fenders of the present invention in the operating configuration;

FIG. 2 is a partial perspective view of a bicycle with the bicycle fender in a storage container;

FIG. 5 is a perspective view of a storage arrangement for the bicycle fender.

DETAILED DESCRIPTION OF THE PREFERRED EMBODIMENTS

Figure 3:
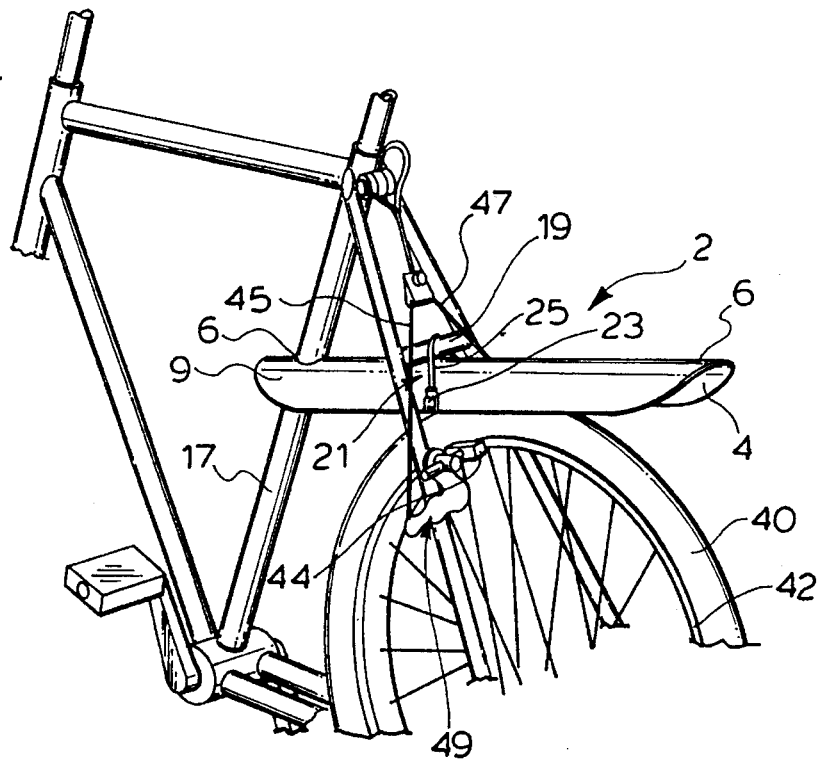
FIG. 3 is a view of the bicycle fender in an operative orientation.

The bicycle fender, generally shown as 2 in FIG. 1, is of a resilient plastic material which has been manufactured such that the fender assumes the operating condition shown in FIG. 1. The fender shown therein is generally straight, however, it is possible to have some curve to the fender. The straight configuration does provide additional rigidity, and therefore, any curve should take into consideration that additional deflection of the fender may occur or have to be compensated for. It is possible to modify the shape or to provide additional longitudinal rib type reinforcing on the fender to counteract this additional deflection. The generally straight configuration is preferred.

The fender is designed to have the end 6 essentially freely supported in a cantilevered relationship such that there is no need to provide a separate arm type attachment to a further point on the bicycle typically adjacent the wheel axle. The fender is secured to the bicycle by means of the securing port 7 releasably attached to a frame member. Attachment is accomplished by merely spreading the tabs 9 to allow the tube member 17 of the bicycle to enter the securing port. The tabs can then be released and the fender is secured to the frame member. As can be seen, a partial slot 8 is defined between the tabs 9 (see FIG. 5). It has been found that a narrow slot eases application over the frame member 17, however, if desired, this can merely be a split line. The split line can also be at a different angle, for example, from the side of the fender to the securing port rather than at the end. This side position reduces distortion when the fender is rolled.

As shown in FIG. 2, the fender in an operating condition has an open channel cross section, generally shown as 4 (FIG. 3), and this provides rigidity to the fender and opposes lateral or vertical deflection of the fender in directions of the arrow 15.

A structural component of the bicycle, i.e. a cross frame member 19 (FIG. 3), allows a fender securing arrangement, generally shown as 21, to partially secure the fender. The securing arrangement 21 includes clip members 23 which are basically small channels which engage either side of the edges of the fender, with these clips being secured together by an elastic member 25. The fender is initially secured to a bicycle by placing the fender through the port normally provided for a fender and securing of the fender on the bicycle such that securing port 6 is placed about a frame member 17. The fender is held in a position above the tire of the bicycle, in a position such as generally shown in FIG. 3, by the elastic member 25 being stretched over the cross frame member 19. Thus, the fender is being positively retained against a structural component of the bicycle. These clip arrangements may be replaced with a fixed clip which is secured in position or the bicycle and releasably engages the fender in the operating condition and maintain the fender at a raised position above the tire.

FIG. 1 also illustrates how plastic clips 10 can be provided which snap over angled frame members 31, and form a friction fit with these components. The fender can then be trapped between these clips and a cross frame 19 of the bicycle. Note that the cross frame member 19 often includes a port 29 which on some bicycles would be used to secure a braking system or could have been used to secure a conventional type fender. A plastic plug member can be provided for engaging this port which allows the elastic member 25 to loop thereover and thus pull the fender up against the bracket 27. In that case, the clip members 10 would not be required.

FIG. 3 illustrates how the fender 2 is in a clear position above the tire 40 and above the rim 42 of the wheel. It can also be seen that the brake pads 44 are at a position below the fender. In FIG. 3, a brake cable arrangement, generally shown as 45 and 47, are beyond these components and operate a pivotted brake arm arrangement, generally shown as 49, for actuating of the brakes. These brakes are of the conventional design and are merely included to show the general relationship and the fact that the fender does not interfere with the braking action. Practically all brakes presently used were designed to include a fender arrangement, and as such, the fender can be located between the brake components and the tire or in a position where it does not interfere with the braking action.

Figure 4:
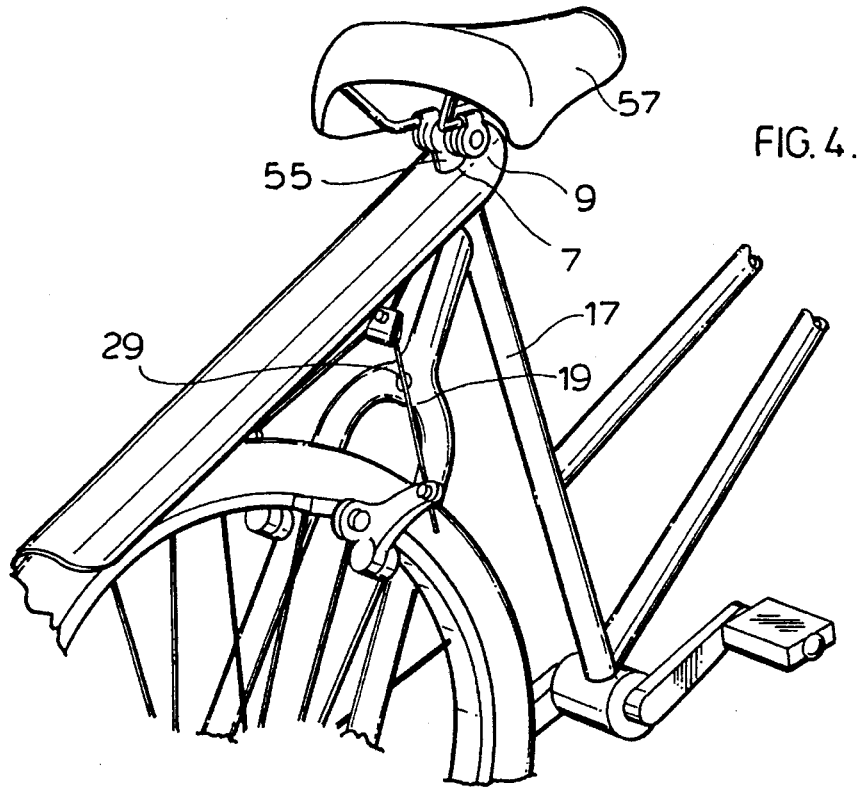
FIG. 4 is a partial perspective view of the bicycle fender in a different operative orientation.

The bicycle fender can also engage the tire and be partially supported by the tire, as shown in FIG. 1 and FIG. 4. The bicycle fender can be made of a resilient plastic, such as a suitable composite material or a suitable combination material. In this case, the fender 2 is secured to a structural member of the bicycle (the seat post 55 or the frame member 17) and the fender is partially supported by the bicycle tire 40. The point of contact between the bicycle fender and the tire is generally shown in FIG. 4. The interior surface of the fender is riding on the upper edge of the tire and the side portions of the channel of the fender are located adjacent the sidewalls of the tire in a manner to positively retain the fender on the tire. It has been found that the tire can continue to rotate and there is very little effect of the tire moving past the stationary fender. Some additional noise may occur, however, this noise is reduced under wet conditions. This configuration has been found to be satisfactory for children's or small frame bicycles where the geometry would otherwise have the fender at a very steep angle, significantly higher than the angle shown in FIG. 1. Therefore, it provides a further operating configuration and in addition, provides an operating configuration which is extremely simple to use. The securing port 6 in this configuration undergoes additional stress to maintain the operating condition for both forward and rearward movement of the bicycle and can be replaced with a clip for more positive engagement, if desired. The fender is such that it remains above the rim or otherwise does not impede the braking system.

Attention should also be directed to FIG. 1 where it is shown that the storage container 20 has been attached beneath the bicycle seat 57. This is only one positive location of the storage container and the storage container could also be secured to a structural bracket much in the manner reflectors are presently secured to bicycles. Thus, the container itself is preferably releasably secured to the bicycle.

In one embodiment, the storage case is directly secured to the bicycle, the fender 2 collapses directly into the storage container, similar to coiling of a metal measuring tape. The storage container has a slot-like opening for receiving of the fender. The opening will be such to allow the fender to move from the flattened type condition suitable for rolling of the fender to the more natural channel shaped configuration of the operating condition.

The storage container 20 can include straps, clips or other arrangements for securement to the bicycle.

The bicycle fender of the present invention allows convenient storage of the bicycle fender, preferably directly on the bicycle, and in a manner that is nonobtrusive. In this way, the bicycle fender will be with the user if the conditions change such that a fender is required. The fender may be quickly secured to the bicycle and the small clip components or securing arrangement can also be retained conveniently in the storage container. It should be noted that in the storage configuration (FIG. 5), the fender has taken on a coiled configuration having a number of overlapping windings and, in the example shown, has approximately a 7 windings. This cross section includes a substantial clear area 24 interior to the fender to avoid damage to the fender. This clear area 24 is used to store the securing clips or other components of the system or other small items, such as keys of the user. Thus, the storage container 20 not only stores the fender in the storage configuration, but it also provides a general purpose storage area or tool storage area for the bicycle. The overall diameter of the coil configuration is less than six inches.

The storage container of FIG. 1 and FIG. 5 need not directly correspond to the coil configuration of the bicycle fender. It has been found that gaps between the fender and the storage container allow a finger gripping area or cavity to simplify removal of the fender may be preferred. In such a container there are gaps to the exterior of the coiled fender which allow the user to engage the outer surface of the coiled fender and the inner surface for pull removal of the fender from the storage container 20. Such a storage container can be of rectangular, square, triangular or other suitable cross section.

The storage container 20, as shown in FIG. 5, has a tubular central portion 22 closed either end by slide-on caps 24.

The storage container 20 can also include reflective surfaces to also act as a reflecting arrangement. It can also be appreciated that the storage container 20 can include a lighting system and have its own power supply located in the storage container.

As shown in FIG. 1, both front and rear fenders can be rollable and placed in the storage container. The front bicycle fender 2a can be secured to the forks 60 and can be held in place by clips 10 or a resilient arrangement, as generally shown in FIG. 1. Again, there is often a port provided adjacent the upper edge of the forks in which a plug may be inserted and an elastic member placed thereover. The fender 2a need not be as long as the fender 2. It has been found that both fenders may be placed in a coiled configuration, with the fender 2a placed interior to the coiled rear fender. In this way, the storage container 20 can retain both fenders while still having a clear center cavity for storage of other components.

The bicycle fenders are preferably made of a resilient plastic material. The plastic material can be a thermal setting plastic material such as a vinyl material. Appropriate additives can be incorporated to achieve the desired stiffness and flexibility to avoid cracking or breakage in operation or when distorted to the storage configuration. It can be appreciated that certain metal substrates can be used, but these are considered less desirable. These substrates may be more useful when coated with a protective coating. With a metal substrate, a separate securing port component can be used, if desired. Such a component can releasably engage the fender and can be maintained on the bicycle frame or release therefrom and be stored in the storage container.

The bicycle fenders of the present invention have a memory and want to assume the operating position. In addition, the fenders are rollable to a coiled configuration to assume a compact storage configuration. This storage configuration allows the fender to easily be carried on the bicycle. The storage container, for example, can be carried in a water bottle bracket or can have its own securing structure or merely be carried in a backpack or bicycle pouch.

In an alternate embodiment, the fender can be sized to engage the braking system exterior to the brake pads and thus utilize the structure supporting the brake pads to support the fender. In a side pull caliper brake system, the system has curved caliper members extending across the top of the tire and the fender can be releasably trapped between the brake pads and the curved callipers. In a cantilevered center pull brake system, as shown in FIG. 1, the fender is trapped exterior to the brake pads and immediately below cross member 19. The fender can be wider at this point and the lower edge is notched or shaped to engage the brake system exterior to the brake pads while providing support for the fender. The relationship of the braking system and fender in FIG. 3 is exaggerated and is much more restricted dimensionally.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A bicycle fender comprising a resilient plastic elongate substrate which is deformable between an operating configuration and a rolled storage configuration, said elongate substrate in said operating configuration having a channel shaped cross section which provides sufficient rigidity and stability to be self-supporting in the operating Configuration, said elongate substrate being transformable to said storage configuration by rolling of said fender upon itself, flattening the channel shaped cross section and creating a bias in said fender urging said fender from said rolled storage configuration towards the operating configuration.

2. A bicycle fender as claimed in claim 1 wherein said fender, when released from the storage configuration, assumes the operating configuration.

3. A bicycle fender as claimed in claim 2 wherein said fender in said storage configuration is in a coil configuration having more than one complete winding.

4. A bicycle fender as claimed in claim 3 wherein said fender, when in said coil configuration, is coiled upon itself to have a plurality of windings.

5. A bicycle fender as claimed in claim 3 wherein said coil configuration is of a diameter less than six inches.

6. A bicycle fender as claimed in claim 4 wherein said coil configuration is of a diameter less than six inches.

7. A bicycle fender as claimed in claim 5 including a retaining arrangement for maintaining said fender in said storage configuration.

8. A bicycle fender as claimed in claim 6 including a retaining arrangement for maintaining said fender in said storage configuration.

9. A bicycle fender as claimed in claim 7 wherein said retaining arrangement is a closable container; said fender, when placed in said container in said storage configuration, being located adjacent the interior periphery of said container, leaving a central area of said container empty for storage of other material.

10. A bicycle fender as claimed in claim 9 wherein said storage container is of a cross section sufficiently different from the coil configuration to space the coil configuration from the interior walls of the retaining arrangement to allow a user to grip the coil configuration on the exterior thereof for ease of removal of said fender.

* * * * *